Jan. 9, 1951      W. H. CHURCHILL      2,537,928
MOUNTING DEVICE FOR CABLE CLAMPS
Filed June 23, 1943
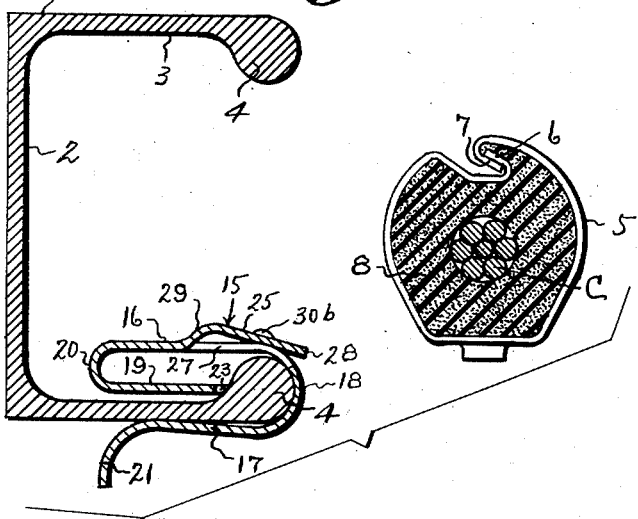
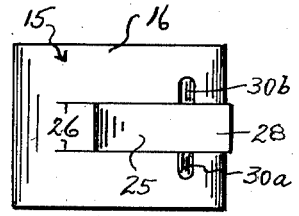
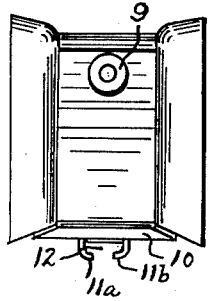
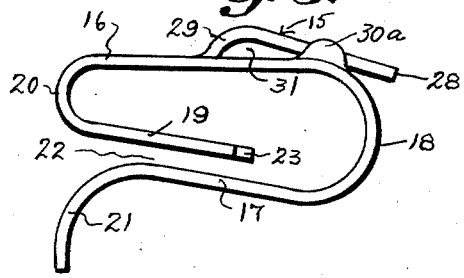
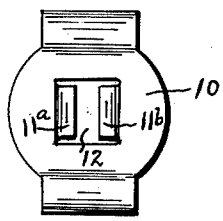
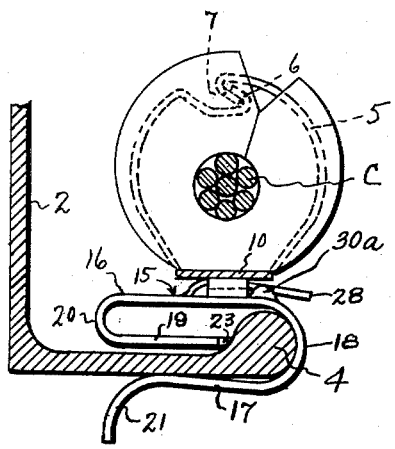
Inventor
Wilmer H. Churchill
By Walter S. Jones
Attorney Patented Jan. 9, 1951

2,537,928

UNITED STATES PATENT OFFICE 2,537,928

MOUNTING DEVICE FOR CABLE CLAMPS

Wilmer H. Churchill, Saugus, Mass., assignor to United-Carr Fastener Corporation, Cambridge, Mass., a corporation of Massachusetts Application June 23, 1943, Serial No. 492,171

1 Claim. (Cl. 24—81)

The present invention relates to cable clamps and mountings therefor to enable the clamp to be quickly and securely mounted on a supporting part and aims generally to improve existing clamps.

One of the objects of the invention is the provision of an improved attaching means enabling the clamp to be quickly and securely mounted on a support.

Another object of the invention is the simplification and improvement of the attaching means or mounting for the clamp whereby the mounting and clamp may be quickly and economically attached to a support, thus effecting a speeding up of the assembly of cable-supporting installations as well as reducing the cost thereof.

Other objects and advantages of the invention will be apparent from an inspection of the accompanying drawings and annexed description illustrating and describing a preferred embodiment of the invention.

In the drawings:

Fig. 1 is a sectional view illustrating a cable clamp according to the invention ready to be attached to an attaching member mounted on a support;

Fig. 2 is an enlarged plan view of the attaching member;

Fig. 3 is a side view thereof;

Fig. 4 is a front elevation of the cable clamp;

Fig. 5 is a bottom plan view thereof; and

Fig. 6 is a view similar to Fig. 1, showing the clamping plate mounted on the supporting part, the clamping plate being shown in elevation.

Referring to the drawings, a typical installation, as illustrated in the drawings, comprises an improved attaching member and clamp adaptable for securing electrical cables or conductors in grouped relation to a framework or other suitable supporting part of aircraft, motor vehicle, ships, buildings or other structures. The framework or supporting part 1 may comprise a metal or other structural shape, for example a channel-shaped girder or beam or like part having a web 2 and spaced flanges 3. The outer edges may be beaded as at 4 as in the case of many structural shapes commonly used in the construction of aircraft framework.

In many installations it is desirable to run a plurality of electrical conductors along a part of the framework between the flanges and it is also desirable to clamp the plurality of conductors together in grouped relation. This advantageously may be accomplished by providing a cable clamp composed of a bandlike member 5, the ends of which may be formed with reversely disposed hooks 6 and 7 to be readily connected together to form a closed loop to receive and hold a plurality of conductors C in grouped relation. The band 5 may have an inner lining of highly flexible insulating material 8, for example, a strip of sponge rubber, connected to the band adjacent the ends thereof by suitable means, for example rivets 9.

The band preferably is also formed with an enlarged base 10 intermediate the ends having retaining flanges 11a and 11b spaced therefrom to provide a recess 12 (Fig. 4). Conveniently this may be accomplished by forming two depending opposed right angular tongues from the base, thus providing the recess 12 between the base 10 and outer portions of the tongues which lie parallel to the base 10.

The invention provides a novel attaching means for quickly and securely detachably mounting the clamp on the support and preferably comprises a resilient member having spaced resilient portions engaging the opposite faces of the support flange 3. The resilient attaching member is so constructed as to be readily slipped or pushed over the flange of the support and is provided with means engaging a part of the flange, for example the bead 4, to prevent displacement therefrom due to accidental causes such as vibration, and also is provided with means for detachably receiving the base of the cable clamp, and it is moved laterally into operative position between the support flanges.

The attaching member is preferably of a size and shape to fit the particular size and type of supporting member with which it is to be used, and I have shown an attaching member to be mounted on a channel section having beaded flange edges 4, such as are commonly used in the construction of aircraft framework. In the illustrated form of the invention, the attaching member 15 (see Figs. 2 and 3) preferably comprises upper and lower portions 16 and 17 respectively, resiliently connected by a bight portion 18, the lower portion 17 converging toward the end of the portion 16 remote from the bight 18, as is shown in Fig. 3. The inner end of the upper portion 16 is reversely bent to provide a locking tongue 19 resiliently connected therewith by a bight 20 and this tongue preferably is disposed in spaced relation to the upper portion 16 and adjacent and substantially parallel to the lower portion 17. The terminal end of the lower portion 17 may be outwardly flared as at 21 to provide a flaring throat 22 to facilitate application of the attaching member 15 to the support 1 and the terminal end of the tongue 19 may have one or more teeth or serrations 23 adapted to grip the part of the support, as for example the bead 4.

The attaching member 15 is adapted to be easily and readily affixed to the support by applying pressure to force it over the flange 3, the bead 4 of which is positioned in the entering throat 22 between the locking tongue 19 and flared end of the lower portion 17. As the attaching member 15 is forced over the bead 4, the lower portion is deflected outwardly and the terminal end of the locking tongue is deflated inwardly toward the upper portion 16. As the terminal end of the locking tongue 19 is forced past the crest of the bead 4 and rides down the curved face thereof toward the flange 3, the attaching member is snapped into locked position as shown in Figs. 1 and 6 with the locking tongue engaging and biting into the inner face of the bead 4. In its applied and locked position in the support, the upper portion 16 of the attaching member and the locking tongue 19 lie substantially parallel to the flange while the lower portion 17 bears against the lower face of the flange under tension. The attaching member may thus be affixed to and mounted on the support by simply pushing it over the flange, and when once applied is securely locked thereon against any force tending to move the attaching member outwardly along the flange.

The attaching member is formed with a clamp-engaging portion 25 and in the illustrated embodiment this is provided by slitting the upper portion 16 along lines 26 (see Fig. 2) to form an opening 27 and an integral tongue 28. The inner end of the tongue is bent outwardly from the portion 16 as at 29 and the tongue is then inclined downwardly and forwardly, having portions lying within the opening 27 and a terminal end extending beyond the bight 18 as clearly shown in Fig. 3. Portions of the upper portion 16, on opposite sides of the recess, are pressed outwardly to provide rounded ears or projections 30a and 30b, and these are preferably forwardly of the inner end of the tongue 28 so as to provide a receiving opening or space 31 for receiving the retaining flanges 11a and 11b of the cable clamp.

It will be understood that a plurality of cables or conductors C may be grouped within the clamp and gripped in grouped relation within the insulating strip as the band is closed and interlocked. The clamp may then be quickly and detachably mounted on the attaching member by moving the clamp on the clamp-engaging portion 25 with the tongue 28 positioned in the recess 12 of the clamp. The retaining flanges 11a and 11b of the clamp base are forced over the rounded ears 30a and 30b, the outer surfaces of which are in effect cams, thus raising the tongue and placing it under tension as the retaining flanges 11a and 11b are moved past the ears 30a and 30b, the tongue 28 again assumes its normal position holding the retaining flanges 11a and 11b adjacent the upper portions 16. The retaining flanges 11a and 11b and clamp are thus effectively held between the ears 30a and 30b and the inner portion 29 of the tongue 28.

Although I have illustrated and described a preferred form of my invention, I do not wish to be limited thereby because the scope of my invention is best defined by the following claim.

I claim:

An attaching member for mounting a part upon a plate-like support comprising a fastener member formed with a part-supporting portion adapted to be positioned on one side of a support, a plurality of reversely extending support-engaging portions extending from opposite ends of said part supporting portion and engaging the oppositely facing superposed surfaces of the support, a resilient tongue on said part-supporting portion for detachably engaging and receiving the part to be supported, and a plurality of ears on said part-supporting portion on opposite sides of said tongue for resisting displacement of the part to be supported therefrom.

WILMER H. CHURCHILL.

REFERENCES CITED

The following references are of record in the file of this patent:

UNITED STATES PATENTS

| Number | Name | Date |
|---|---|---|
| 556,200 | McDonald | Mar. 10, 1896 |
| 763,987 | Kreibel | July 5, 1904 |
| 2,108,347 | Quarnstrom | Feb. 15, 1938 |
| 2,172,787 | Brownell | Sept. 12, 1939 |
| 2,231,153 | Camiener | Feb. 11, 1941 |
| 2,327,326 | Churchill | Aug. 17, 1943 |
| 2,329,894 | Hall | Sept. 21, 1943 |